Patented Nov. 4, 1952

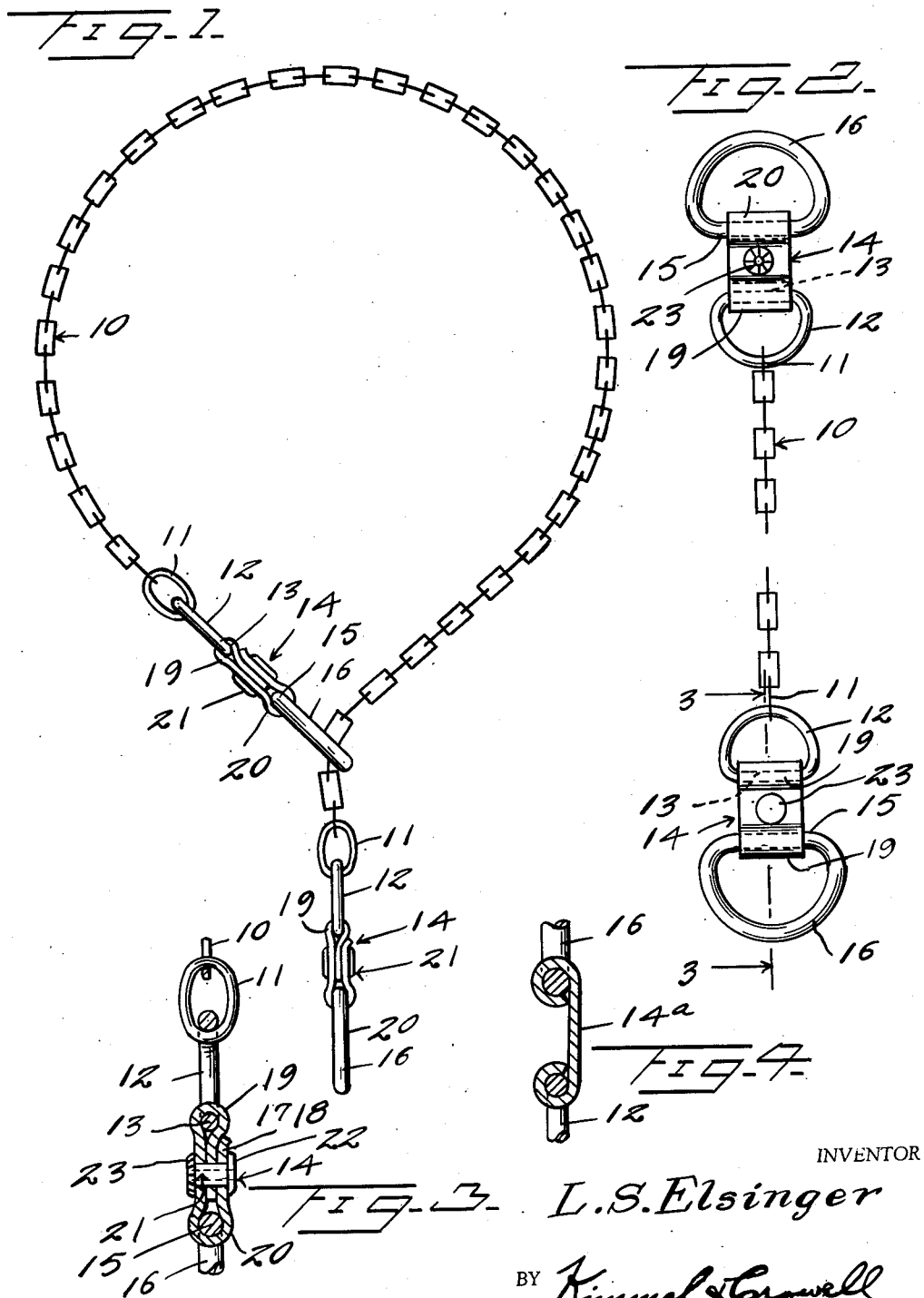

2,616,394

UNITED STATES PATENT OFFICE 2,616,394

CHOKE COLLAR

Louis S. Elsinger, Atlanta, Ga., assignor to The Show Off Corporation, Dover, Del., a corporation of Delaware Application October 16, 1950, Serial No. 190,381

1 Claim. (Cl. 119—106)

This invention relates to a choke collar, and, more particularly, to a choke collar adapted to be used in the training of dogs.

The primary object of the invention is the provision of an improved choke collar characterized by means for retaining the connecting ring in flat condition relative to the neck of the dog at all times regardless of the pressure exerted on the choke collar in order to prevent injury to the animal.

An additional object of the invention is the provision of such a means characterized by a flat connection between the connecting ring proper and an adjacent ring whereby both of said rings will automatically be turned to flat position relative to the neck of the dog upon the exertion of any pressure tending to contract the choke chain.

As conducive to a clearer understanding of this invention, it may be pointed out that choke collars for training dogs have hitherto comprised chains adapted to surround the neck of the dog and provided at either end with connecting rings through one of which the chain is adapted to be passed in order to provide a noose or loop about the neck of the dog whereby when the dog, in disobedience to a command, exerts pressure on the leash, the noose is tightened about his neck effecting a mild choking action until the dog ceases to exert pressure on the leash. Hitherto these connecting rings have been directly attached to the ends of the chain, and in a majority of instances, when a sudden pressure is exerted on the leash, the ring turns at right angles to the neck of the animal and the sudden pressure causes the relatively sharp edge of the ring to bite into the neck of the animal with sufficient degree to injure the animal.

An important object of this invention is, therefore, to provide a means whereby the ring will always lie flat relative to the neck of the dog regardless of the suddenness with which pressure is exerted on the choke collar, thus obviating completely the possibility of such injury.

Other objects will in part be obvious and in part be pointed out as the description if the invention proceeds and shown in the accompanying drawings wherein there is disclosed a preferred embodiment of this inventive concept.

In the drawings:

Figure 1 is a side elevational view of one form of choke collar shown as a loop or noose and embodying the instant inventive concept.

Figure 2 is an end elevational view of the construction shown in Figure 1, partially broken away.

Figure 3 is an enlarged fragmentary sectional view taken substantially along the line 3—3 of Figure 2 as viewed in the direction indicated by the arrows; and Figure 4 is a fragmentary detail view showing a modified form of flat connection.

Referring now to the invention in detail the coke colar is comprised of a flexible link chain generally indicated at 10 of a length designed to loosely surround the neck of a dog to which it is applied. At each end of the chain 10 there is positioned a relatively small ring 11, of generally oval configuration adapted to be connected to the end of the chain in such manner that it is normally at right angles to the surface of the dog's neck. The rings 11 are relatively small and rounded in such manner that an edgewise engagement with the neck of the animal will not occasion injury.

Connected to each ring 11 is a D-shaped ring 12 adapted to lie in a plane at right angles to the ring 11 or normally in a plane parallel to that of the surface of the dog's neck. To the flat side 13 of each ring 12 is secured a coupling member generally indicated at 14, to be more fully described hereinafter, to the opposite end of which in turn is secured the flat side 15, of a D-shaped coupling ring 16, of a larger size than the ring 12, the size being sufficient so that the link 12 may be passed therethrough, for a purpose to be more fully described hereinafter.

Referring now in detail to the coupling member 14, it will be seen that the latter comprises a relatively flat strip or band of leather, plastic, metal or any desired material doubly reverted upon itself as at 17 and 18, to provide loops 19 and 20 which surround the straight sides 13 and 15, respectively, of rings 12 and 16. The reverted ends are secured together as by means of a stud 21 passed through the band and provided at one side with a head 22, the opposite end being upset as at 23 to provide a rivet connection. It will thus be seen that there is provided a flat band connection between D-shaped rings 12 and 16 which will cause the two rings or links always to lie in substantially the same flat plane relative to the neck of the animal regardless of the pressure exerted on the choke collar by the animal, this plane being additionally maintained by the relative positioning of the ring or link 11. As seen in Figure 4, the flat strip or band 14a may be used and obviously eliminates the need of the stud 21 or rivet connection.

Due to the relative dimensions of the rings 12 and 16, it will be understood that when it is desired to form the collar into a noose as shown in Figure 1, the ring 12 may be folded about its flat portion 13 inwardly of the strap 14, the ring 16 folded correspondingly inwardly to meet the same, and the ring 12 passed entirely through the ring 16, chain 10 obviously following to form a loop or noose as shown in Figure 1. Obviously by a reverse folding action the loop may be released and the chain assume the straight form shown in Figure 2.

From the foregoing it will now be seen that there is provided herein an improved choke collar which accomplishes all the objects of this invention including others of great practical utility in precluding injury to an animal upon which the collar is used.

The invention as disclosed herein has been thoroughly tested and has received the highest praise of outstanding authorities for its humaneness.

As many embodiments may be made of this inventive concept and as many modifications may be made in the embodiment hereinbefore shown and described, it is to be understood that all matter herein is to be interpreted merely as illustrative and not in a limiting sense.

I claim:

A choke collar for training dogs, comprising a chain adapted to extend loosely about the neck of a dog, a ring connected to each end of the chain and adapted to normally extend at right angles to the surface of the dog's neck, a coupling assembly connected to each ring, each coupling assembly having a small D-shaped member attached to the ring, said small D-shaped member having one straight side, a large D-shaped member having one straight side, and a coupling strip having a loop on each end thereof and being of a length between loops adapted to pass in an edgewise manner through the large D-shaped member, said D-shaped members being respectively pivotally connected by their respective straight sides to the respective loops of the coupling strip and adapted to fold against the sides thereof, said coupling assembly when folded being adapted to pass through the large D-shaped link in an edgewise manner, through the large D-shaped member of the other coupling assembly, whereby the choke collar can be connected to or released from the dog's neck, but when the D-shaped members are unfolded from the coupling strip the coupling assemblies will be prevented from disengaging from each other as when on the dog's neck.

LOUIS S. ELSINGER.

REFERENCES CITED

The following references are of record in the file of this patent:

UNITED STATES PATENTS

| Number | Name | Date |
| --- | --- | --- |
| 1,906,073 | McCarty | Apr. 25, 1933 |
| 1,924,596 | Davis | Aug. 29, 1933 |
| 2,101,588 | Lisowitz | Dec. 7, 1937 |